United States Patent
Hack et al.

(10) Patent No.: US 10,956,126 B2
(45) Date of Patent: *Mar. 23, 2021

(54) EXECUTING PERFORM FLOATING POINT OPERATION INSTRUCTIONS

(71) Applicant: INTERNATIONAL BUSINESS MACHINES CORPORATION, Armonk, NY (US)

(72) Inventors: Michel H. T. Hack, Cortlandt Manor, NY (US); Ronald M. Smith, Sr., Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,178

(22) Filed: May 17, 2019

(65) Prior Publication Data

US 2019/0272149 A1   Sep. 5, 2019

Related U.S. Application Data

(63) Continuation of application No. 16/046,491, filed on Jul. 26, 2018, now Pat. No. 10,387,117, which is a
(Continued)

(51) Int. Cl.
*G06F 9/00* (2006.01)
*G06F 7/483* (2006.01)
(Continued)

(52) U.S. Cl.
CPC ............ *G06F 7/483* (2013.01); *G06F 7/4991* (2013.01); *G06F 9/30014* (2013.01);
(Continued)

(58) Field of Classification Search
CPC ........................ G06F 9/30014; G06F 9/30025
See application file for complete search history.

(56) References Cited

U.S. PATENT DOCUMENTS 5,559,977 A   9/1996   Dror et al.
5,696,709 A   12/1997  Smith
(Continued)

OTHER PUBLICATIONS

A Summary of Densely Packed Decimal Encoding, www.2.hursley.ibm.com/decimal/DPDecimal .html, Apr. 2007, pp. 1-5.
(Continued)

*Primary Examiner* — Jacob Petranek
(74) *Attorney, Agent, or Firm* — Steven Chiu, Esq.; Kevin P. Radigan, Esq.; Heslin Rothenberg Farley & Mesiti P.C.

(57) ABSTRACT

Execution of a machine instruction in a central processing unit. A perform floating-point operation instruction and a test bit are obtained. If the test bit has a first value, a specified floating-point operation function is performed, and a condition code is set to a value determined by the specified function. If the test bit has a second value, a check is made to determine if the specified function is valid and installed on the machine. If the specified function is valid and installed on the machine, the condition code is set to one code value, and if the specified function is either not valid or not installed on the machine, the condition code is set to a second code value.

20 Claims, 10 Drawing Sheets

Related U.S. Application Data continuation of application No. 15/137,272, filed on Apr. 25, 2016, now Pat. No. 10,061,560, which is a continuation of application No. 14/143,047, filed on Dec. 30, 2013, now Pat. No. 9,323,497, which is a continuation of application No. 11/868,605, filed on Oct. 8, 2007, now Pat. No. 8,627,050.

(51) Int. Cl.
  *G06F 9/30* (2018.01)
  *G06F 7/499* (2006.01)
(52) U.S. Cl.
  CPC ...... *G06F 9/30025* (2013.01); *G06F 9/30094* (2013.01); *G06F 9/30181* (2013.01)

(56) References Cited

U.S. PATENT DOCUMENTS

| | | | |
|---|---|---|---|
| 5,796,641 A | 8/1998 | Tu | |
| 5,825,678 A | 10/1998 | Smith | |
| 5,889,980 A | 3/1999 | Smith | |
| 5,978,901 A | 11/1999 | Luedtke et al. | |
| 6,473,807 B1 | 10/2002 | Hills et al. | |
| 7,009,615 B1* | 3/2006 | Kilgard | G06T 1/60 345/506 |
| 7,047,401 B2 | 5/2006 | Seal et al. | |
| 7,251,811 B2 | 7/2007 | Rosner et al. | |
| 7,343,479 B2 | 3/2008 | Knebel et al. | |
| 7,840,622 B2 | 11/2010 | Gerwig et al. | |
| 7,865,882 B2 | 1/2011 | Hack | |
| 7,921,144 B2 | 4/2011 | Hack | |
| 8,010,922 B2 | 8/2011 | Malgioglio et al. | |
| 8,051,118 B2 | 11/2011 | Lundvall et al. | |
| 8,051,119 B2 | 11/2011 | Lundvall et al. | |
| 8,060,545 B2 | 11/2011 | Lundvall et al. | |
| 8,082,282 B2 | 12/2011 | Lundvall et al. | |
| 8,364,734 B2 | 1/2013 | Carlough | |
| 8,627,050 B2 | 1/2014 | Hack et al. | |
| 9,323,497 B2 | 4/2016 | Hack et al. | |
| 10,061,560 B2 | 8/2018 | Hack et al. | |
| 2005/0065990 A1 | 3/2005 | Allen | |
| 2007/0022152 A1 | 1/2007 | Gerwig et al. | |
| 2007/0061387 A1 | 3/2007 | Carlough et al. | |
| 2008/0215659 A1 | 9/2008 | Cowlishaw et al. | |
| 2008/0270508 A1 | 10/2008 | Lundvall et al. | |
| 2009/0094441 A1 | 4/2009 | Hack et al. | |
| 2011/0214042 A1 | 9/2011 | Lundvall et al. | |
| 2018/0329684 A1 | 11/2018 | Hack et al. | |

OTHER PUBLICATIONS

Cowlishaw, "Densely Packed Decimal Encoding," IEEE Proceedings Computer Digital Tech, ISBN1350-2387, vol. 149, No. 3, May 2002, pp. 101-104.

Draft Standard for Floating Point Arithmetic P754, Rev. 1.3.0, Feb. 2007, pp. 1-60.

IBM, "z/Architecture—Preliminary Decimal Floating Point Architecture," SA23-2232-00, Nov. 2006, pp. 1-60.

IBM, "z/Architecture—Principles of Operation," $6^{th}$ Edition, SA22-7832-05, Apr. 2007, pp. 1-1218.

IBM, z/Architecture Principles of Operation, IBM Corporation, SA22-7832-01, $2^{nd}$ Edition, Oct. 2001. This earlier version of the subject document is being submitted for additional consideration. For example, Examiner is directed to pp. 7-115 to 7-130 with respect to the clearly distinguishable PLO instruction.

IEEE Standard for Binaiy Floating Point Arithmetic, ANSI/IEEE Std. 754-1985, 1985 (no further information available), pp. 1-23.

IEEE Standard for Radix-Independent Floating-Point Arithmetic, IEEE Std. 845-1987, Oct. 1987, pp. 1-19.

Intel 64 and IA 32 Architecture Software Developer's Manual, vol. 2A, Instruction Set Reference, A-M. 253666-022US, Nov. 2006, pp. 1-744.

Intel 64 and 1A-32 Architectures Software Developer's Manual, vol. 1: Basic Architecture, 253665-022US, Nov. 2006, pp. 1-468.

Intel Itanium Architecture Software Developers Manual, vol. 1, Application Architecture Revision 2.2., Doc. No. 245317-005, Jan. 2006, pp. 1-250.

Intel Itanium Architecture Software Developers Manual, vol. 2, System Architecture, Rev. 2.2., Doc. No. 245318-005, Jan. 2006, pp. 1-601.

Intel Itanium Architecture Software Developers Manual, vol. 3, Instruction Set Reference,. Rev. 2.2., Doc. No. 245319-005, Jan. 2006, pp. 1-986.

Perform Floating-Point Operation, Chapter 9, Floating-Point Overview and Support Instructions, pp. 9-31. through 9-40 from IBM SA22-7832-05, z/Architecture Principles of Operation, Apr. 2007.

Power PC User Instruction Set Architecture, Book 1, Version 2.01, Sep. 2003, pp. 1-219.

Hack et al., "List of IBM Patents and/or Patent Applications Treated as Related", U.S. Appl. No. 16/415,178, filed May 17, 2019, dated May 20, 2019 (2 pages).

* cited by examiner

| GR0 BITS 33-55 (HEX) | FUNCTION | EXCEPTIONS | | | |
|---|---|---|---|---|---|
| 010500 | CONVERT HFP SHORT TO BFP SHORT | SP Da | | Xo Xu | |
| 010600 | CONVERT HFP SHORT TO BFP LONG | SP Da | | | |
| 010700 | CONVERT HFP SHORT TO BFP EXTENDED | SP Da | | | |
| 010800 | CONVERT HFP SHORT TO DFP SHORT | SP Da | | | Xx |
| 010900 | CONVERT HFP SHORT TO DFP LONG | SP Da | | | Xx |
| 010A00 | CONVERT HFP SHORT TO DFP EXTENDED | SP Da | | | Xx |
| 010501 | CONVERT HFP LONG TO BFP SHORT | SP Da | | Xo Xu | Xx |
| 010601 | CONVERT HFP LONG TO BFP LONG | SP Da | | | Xx |
| 010701 | CONVERT HFP LONG TO BFP EXTENDED | SP Da | | | |
| 010801 | CONVERT HFP LONG TO DFP SHORT | SP Da | | | Xx |
| 010901 | CONVERT HFP LONG TO DFP LONG | SP Da | | | Xx |
| 010A01 | CONVERT HFP LONG TO DFP EXTENDED | SP Da | | | Xx |
| 010502 | CONVERT HFP EXTENDED TO BFP SHORT | SP Da | | Xo Xu | Xx |
| 010602 | CONVERT HFP EXTENDED TO BFP LONG | SP Da | | | Xx |
| 010702 | CONVERT HFP EXTENDED TO BFP EXTENDED | SP Da | | | |
| 010802 | CONVERT HFP EXTENDED TO DFP SHORT | SP Da | | | Xx |
| 010902 | CONVERT HFP EXTENDED TO DFP LONG | SP Da | | | Xx |
| 010A02 | CONVERT HFP EXTENDED TO DFP EXTENDED | SP Da | | | Xx |
| 010005 | CONVERT BFP SHORT TO HFP SHORT | SP Da Xi | | | Xx |
| 010105 | CONVERT BFP SHORT TO HFP LONG | SP Da Xi | | | |
| 010205 | CONVERT BFP SHORT TO HFP EXTENDED | SP Da Xi | | | |
| 010805 | CONVERT BFP SHORT TO DFP SHORT | SP Da Xi | | | Xx |
| 010905 | CONVERT BFP SHORT TO DFP LONG | SP Da Xi | | | Xx |
| 010A05 | CONVERT BFP SHORT TO DFP EXTENDED | SP Da Xi | | | Xx |
| 010006 | CONVERT BFP LONG TO HFP SHORT | SP Da Xi | | Xo Xu | Xx |
| 010106 | CONVERT BFP LONG TO HFP LONG | SP Da Xi | | Xo Xu | |
| 010206 | CONVERT BFP LONG TO HFP EXTENDED | SP Da Xi | | Xo Xu | |
| 010806 | CONVERT BFP LONG TO DFP SHORT | SP Da Xi | | Xo Xu | Xx |
| 010906 | CONVERT BFP LONG TO DFP LONG | SP Da Xi | | | Xx |
| 010A06 | CONVERT BFP LONG TO DFP EXTENDED | SP Da Xi | | | Xx |

| | | | | | | |
|---|---|---|---|---|---|---|
| 010007 | CONVERT BFP EXTENDED TO HFP SHORT | SP | Da Xi | Xo | Xu | Xx |
| 010107 | CONVERT BFP EXTENDED TO HFP LONG | SP | Da Xi | Xo | Xu | Xx |
| 010207 | CONVERT BFP EXTENDED TO HFP EXTENDED | SP | Da Xi | Xo | Xu | Xx |
| 010807 | CONVERT BFP EXTENDED TO DFP SHORT | SP | Da Xi | Xo | Xu | Xx |
| 010907 | CONVERT BFP EXTENDED TO DFP LONG | SP | Da Xi | Xo | Xu | Xx |
| 010A07 | CONVERT BFP EXTENDED TO DFP EXTENDED | SP | Da Xi | | | Xx |
| 010008 | CONVERT DFP SHORT TO HFP SHORT | SP | Da Xi | Xo | Xu | Xx |
| 010108 | CONVERT DFP SHORT TO HFP LONG | SP | Da Xi | Xo | Xu | Xx |
| 010208 | CONVERT DFP SHORT TO HFP EXTENDED | SP | Da Xi | Xo | Xu | Xx |
| 010508 | CONVERT DFP SHORT TO BFP SHORT | SP | Da Xi | Xo | Xu | Xx |
| 010608 | CONVERT DFP SHORT TO BFP LONG | SP | Da Xi | | | Xx |
| 010708 | CONVERT BFP LONG TO DFP EXTENDED | SP | Da Xi | | | Xx |
| 010009 | CONVERT DFP LONG TO HFP SHORT | SP | Da Xi | Xo | Xu | Xx |
| 010109 | CONVERT DFP LONG TO HFP LONG | SP | Da Xi | Xo | Xu | Xx |
| 010209 | CONVERT DFP LONG TO HFP EXTENDED | SP | Da Xi | Xo | Xu | Xx |
| 010509 | CONVERT DFP LONG TO BFP SHORT | SP | Da Xi | Xo | Xu | Xx |
| 010609 | CONVERT DFP LONG TO BFP LONG | SP | Da Xi | Xo | Xu | Xx |
| 010709 | CONVERT DFP LONG TO BFP EXTENDED | SP | Da Xi | | | Xx |
| 01000A | CONVERT DFP EXTENDED TO HFP SHORT | SP | Da Xi | Xo | Xu | Xx |
| 01010A | CONVERT DFP EXTENDED TO HFP LONG | SP | Da Xi | Xo | Xu | Xx |
| 01020A | CONVERT DFP EXTENDED TO HFP EXTENDED | SP | Da Xi | Xo | Xu | Xx |
| 01050A | CONVERT DFP EXTENDED TO BFP SHORT | SP | Da Xi | Xo | Xu | Xx |
| 01060A | CONVERT DFP EXTENDED TO BFP LONG | SP | Da Xi | Xo | Xu | Xx |
| 01070A | CONVERT DFP EXTENDED TO BFP EXTENDED | SP | Da Xi | Xo | Xu | Xx |

EXPLANATION:
Da  AFP-REGISTER DATA EXCEPTION.
SP  SPECIFICATION EXCEPTION.
Xi  IEEE-INVALID-OPERATION EXCEPTION.
Xo  IEEE-OVERFLOW EXCEPTION.
Xu  IEEE-UNDERFLOW EXCEPTION.
Xx  IEEE-INEXACT EXCEPTION.

FIG.2B

GENERAL REGISTER 0 (GR0)

| GR0 BIT(S) | NAME AND DETAIL |
|---|---|
| 0–31 | RESERVED/IGNORED |
| 32 | TEST BIT |
| 33–39 | PFPO-OPERATION-TYPE CODE |
| 40–47 | PFPO-OPERAND-FORMAL CODE FOR OPERAND 1 |
| 48–55 | PFPO-OPERAND-FORMAL CODE FOR OPERAND 2 |
| 56 | INEXACT-SUPPRESSION CONTROL |
| 57 | ALTERNATE-EXCEPTION-ACTION CONTROL |
| 58–59 | TARGET-RADIX-DEPENDENT CONTROLS |
| 60–63 | PFPO ROUNDING METHOD |

FIG.3

PERFORM FLOATING POINT
OPERATION INSTRUCTION

PFPO          [E]

| '010A' |
|---|
0            15

FIG.4

CONDITION CODE

| RADIX OF TARGET | GR0 BIT | MEANING |
|---|---|---|
| HFP | 58 | HFP-OVERFLOW CONTROL |
| HFP | 59 | HFP-UNDERFLOW CONTROL |
| BFP | 58 | RESERVED, MUST BE ZERO |
| BFP | 59 | RESERVED, MUST BE ZERO |
| DFP | 58 | RESERVED, MUST BE ZERO |
| DFP | 59 | DFP PREFERRED-QUANTUM CONTROL (DPQC) |

PFPO-TARGET-RADIX-DEPENENT CONTROLS
(GR0, BITS 58-59)

FIG.16

| VALUE | METHOD* |
|---|---|
| 0 | ACCORDING TO CURRENT DFP ROUNDING MODE |
| 1 | ACCORDING TO CURRENT BFP ROUNDING MODE |
| 2-7 | RESERVED/INVALID |
| 8 | ROUND TO NEAREST WITH TIES TO EVEN |
| 9 | ROUND TO 0 |
| 10 | ROUND TOWARD +∞ |
| 11 | ROUND TOWARD -∞ |
| 12 | ROUND TO NEAREST WITH TIES AWAY FROM 0 |
| 13 | ROUND TO NEAREST WITH TIES TOWARD 0 |
| 14 | ROUND AWAY FROM 0 |
| 15 | ROUND TO PREPARE FOR SHORTER PRECISION |

* ALL ROUNDING METHODS, OTHER THAN THOSE LISTED AS RESERVED, ARE VALID FOR ANY CONVERSION FUNCTION, REGARDLESS OF THE RADIX OF THE RESULT.

PFPO-ROUNDING METHOD
(GR0 BITS 60-63)

FIG.13

| OP TYPE CODE (HEX) | |
|---|---|
| 00 | RESERVED/INVALID |
| 01 | PFPO CONVERT FLOATING-POINT RADIX |
| 02-7F | RESERVED/INVALID |

PFPO-OPERATION-TYPE CODE
(GR0 BITS 33-39)

FIG.15

| CODE (HEX) | |
|---|---|
| 00 | HFP SHORT |
| 01 | HFP LONG |
| 02 | HFP EXTENDED |
| 03 | RESERVED/INVALID |
| 04 | RESERVED/INVALID |
| 05 | BFP SHORT |
| 06 | BFP LONG |
| 07 | BFP EXTENDED |
| 08 | DFP SHORT |
| 09 | DFP LONG |
| 0A | DFP EXTENDED |
| 0B-FF | RESERVED/INVALID |

PFPO-OPERAND-FORMAT CODES
(GR0 BITS 4-47 AND 48-55)

EXECUTING PERFORM FLOATING POINT OPERATION INSTRUCTIONS

This application is a continuation of U.S. patent application Ser. No. 16/046,491 entitled "EXECUTING PERFORM FLOATING POINT OPERATION INSTRUCTIONS," filed Jul. 26, 2018, which is a continuation of U.S. Pat. No. 10,061,560 entitled "EXECUTING PERFORM FLOATING POINT OPERATION INSTRUCTIONS," issued Aug. 28, 2018, which is a continuation of U.S. Pat. No. 9,323,497 entitled "EXECUTING PERFORM FLOATING POINT OPERATION INSTRUCTIONS" issued Apr. 26, 2016, which is a continuation of U.S. Pat. No. 8,627,050 entitled "EXECUTING PERFORM FLOATING POINT OPERATION INSTRUCTIONS" issued Jan. 7, 2014, each of which is incorporated herein by reference in its entirety.

BACKGROUND

This invention relates, in general, to facilitating processing within a processing environment, and more specifically, to managing processing associated with floating point operations. Even more specifically, the preferred embodiment of the invention relates to a floating-point operation instruction, which augments the IBM z/Architecture® and can be emulated by other architectures.

Floating point is used to represent real numbers on computers. There are different types of floating point arithmetic, including binary floating point and decimal floating point, as examples. Floating point numbers are discussed in IEEE STD 754-1985, IEEE Standard for Binary Floating-Point Arithmetic; and in IEEE STD 854-1987, IEEE Standard for Radix-Independent Floating-Point Arithmetic, which are hereby incorporated herein by reference in their entirety.

Binary floating-point numbers are represented in computer hardware as base two (binary) fractions. While binary floating point has been very valuable over the years, there are some limitations with binary floating-point operations. For instance, binary floating point cannot represent some decimal fractions, such as 0.1; and the scaling of binary floating point requires rounding. Due to the limitations of binary floating point, decimal floating point has evolved for use in computational processing in computers and other processing environments.

Decimal floating point is easier to comprehend, since decimal data is the most common of all numeric data. A decimal floating-point finite number includes a sign bit, an exponent and a significand. The sign bit is zero for plus and one for minus. The exponent, a signed value, is represented as an unsigned binary value by adding a bias, resulting in a biased exponent. The significand includes a string of decimal digits, where each digit is an integral value between zero and one less than the radix (i.e., 10 is the radix for decimal). The number of digit positions in the significand is called the precision of the floating-point number. The numerical value of a decimal floating-point finite number is represented as $(-1)^{sign} \times significand \times 10^{exponent}$. The value of $1 \times 10^{exponent}$ is called the quantum.

Floating point numbers may be represented in a variety of data formats: short, long, or extended. For example, for decimal floating-point numbers, the short format includes 32 bits, the long format includes 64 bits, and the extended format includes 128 bits.

A computer system or machine may be provided with a multitude of floating point operation functions. For instance, an instruction may be provided to convert from binary to decimal, another instruction may convert from hexadecimal to binary. Such instructions may provide for selecting any one of the short, long and extended formats. Other functions, known in the art, may be provided for overflow control, underflow control, suppression control and exception control.

Not all available functions are installed on every computer, however. Presently there is not available a floating point operation instruction that instructs the computer both to determine whether a requested floating point function is installed on the computer, and, if the function is installed, to perform that function.

SUMMARY

In one aspect, processing associated with floating point operations is improved.

In one aspect, a simple mechanism is provided for a computer to determine whether a requested floating-point operation function is installed on the computer, and, if that function is not installed, to inform a program or application, which is running on the computer, of the fact that the requested function is not installed.

Shortcomings of the prior art are overcome and additional advantages are provided through the provision of a computer-implemented method of performing an instruction for converting a floating-point operand. The computer-implemented method including executing, by a processor, the instruction, the executing including: based on a test indicator being one value: performing a specified floating-point conversion function to produce a result, wherein the specified floating-point conversion function is one of a plurality of specifiable floating-point conversion functions, wherein the processor is configured to execute installed floating-point conversion functions of the plurality of specifiable floating-point conversion functions; storing the result; and setting a condition code, the condition code indicating whether the performing the specified floating-point conversion function encountered an exceptional condition; and based on the test indicator being another value: determining whether the specified floating-point conversion function is an installed floating-point conversion function; setting the condition code without storing a result, the condition code indicating whether the specified floating-point conversion function is an installed floating-point conversion function; and setting a return code.

The following documents are herein incorporated by reference in their entireties:
1. U.S. Pat. No. 7,921,144 for "Fast Correctly-Founding Floating-Point Conversion," issued Apr. 5, 2011;
2. U.S. Pat. No. 7,865,882 for "Fast Correctly Rounding Floating-Point Conversion and Identifying Exceptional Conversion," issued Jan. 4, 2011;
3. U.S. Pat. No. 5,889,980 for "Mode Independent Support of Format Conversion Instructions for Hexadecimal and Binary Floating Point Processing," issued Mar. 30, 1999;
4. U.S. Pat. No. 5,796,641 for "System and Table-Based Method for Converting Binary Floating-Point Numbers to A Decimal Representation," issued May 20, 1996;
5. U.S. Pat. No. 8,364,734 for "Converting From Decimal Floating Point Into Scaled Binary Coded Decimal," issued Jan. 29, 2013; and
6. U.S. Pat. No. 7,840,622 for "Method and Floating Point Unit to Convert A Hexadecimal Floating Point Number to a Binary Floating Point Number," issued Nov. 23, 2010.
Each of the above-listed documents is hereby incorporated herein by reference in its entirety.

Further benefits and advantages of aspects of this invention will become apparent from a consideration of the following detailed description, given with reference to the accompanying drawings, which specify and show embodiments of the invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 2, 2A and 2B show valid codes for basic perform floating-point operation (PFPO) functions that may be installed.

FIG. 3 illustrates a PFPO instruction in accordance with the present invention.

FIG. 4 shows a general register that is used to request a PFPO function.

FIG. 5 shows a condition code used in the present invention.

FIGS. 13-16 summarize fields and bits in a General Register 0 (GR0) in an embodiment of the invention. FIG. 13 shows PFPO-Operation-type code (GR0 bits 33-39), and FIG. 14 shows PFPO-Operand-Format Codes (GR0 bits 40-47 and 48-55), FIG. 15 shows PFPO-Target-Radix-Dependent Controls (GR0 bits 58-59), and FIG. 16 shows PFPO-Rounding Method (GR0 bits 60-63).

In these Figures, "valid" codes are codes for defined functions that may be installed, and the other codes are "invalid". For example, in FIG. 13 code 01 is a valid code, and codes 00 and 02-7F are invalid. In FIG. 15, codes 00 to 0A are valid and codes 0B-FF are invalid. In FIG. 14, bit 58 being "1" is not valid for BFP and DFP targets, and bit 59 being "1" is not valid for BFP target. In FIG. 16, values of 207 are invalid.

DETAILED DESCRIPTION

Figure 1A:
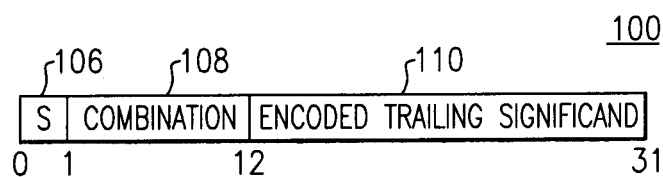
FIG. 1A depicts one embodiment of a short data format of a decimal floating-point number.
Figure 1B:
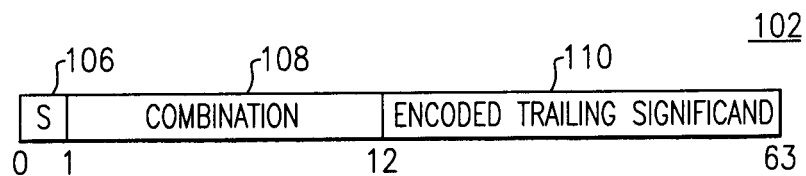
FIG. 1B depicts one embodiment of a long data format of a decimal floating-point number.
Figure 1C:
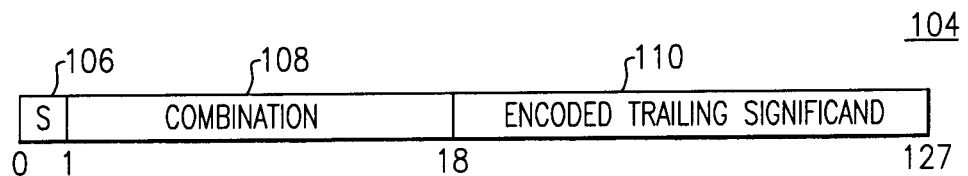
FIG. 1C depicts one embodiment of an extended data format of a decimal floating-point number.

Aspects of the present invention, generally, relates to managing processes associated with floating point operations on a computer system or machine. As indicated above, floating point numbers may be represented in a variety of formats: short, long and extended. FIGS. 1A, 1B and 1C show a decimal floating-point number in these formats. More specifically, FIG. 1A depicts one example of a short data format representation 100 of a decimal floating point number; FIG. 1B depicts one example of a long data format representation 102 of a decimal floating point number; and FIG. 1C depicts one embodiment of an extended data format representation 104 of a decimal floating point number.

Each data format is of a different length, but has the same fields. The fields include, for instance, the following:

A sign field (S) 106 represents the sign bit of the decimal floating-point number. In one example, it is bit 0 in each format, and is set to zero for plus and one for minus;

A combination field 108: For finite numbers, this field includes the biased exponent and the leftmost digit of the significand; for NaNs and infinities, this field includes codes to identify them.

When bits 1-5 of the format are in the range of 00000-11101, the operand is a finite number. The two leftmost bits of the biased exponent and the leftmost digit of the significand are encoded in bits 1-5 of the format. Bit 6 through the end of the combination field includes the rest of the biased exponent.

When bits 1-5 of the format field are 11110, the operand is an infinity. All bits in the combination field to the right of bit 5 of the format constitute the reserved field for infinity. A nonzero value in the reserved field is accepted in a source infinity; the reserved field is set to zero in a resultant infinity.

When bits 1-5 of the format are 11111, the operand is a NaN and bit 6, called the SNaN bit, further distinguishes QNaN from SNaN. If bit 6 is zero, then it is QNaN; otherwise, it is SNaN. All bits in the combination field to the right of bit 6 of the format constitute the reserved field for NaN. A nonzero value in the reserved field is accepted in a source NaN; the reserved field is set to zero in a resultant NaN.

As mentioned above, a computer system may be provided with a multitude of floating point operation functions; and for example, FIG. 2 identifies a number of such functions. These functions may be provided to convert between binary, decimal and hex numbers and to convert between the short, long and extended formats as shown for example in the z/Architecture Principles of Operation from IBM. Additional functions may be provided for overflow control, underflow control suppression control and exception control.

While aspects of the present invention is described herein in terms of the well-known z/Architecture from IBM, other implementations are possible in light of the teaching of the present invention herein. To implement a floating-point operation, a program loads a register with function code and other appropriate control bits. FIG. 3 summarizes the fields and bits of such a register, referred to as General Register 0, or GR0. As can be seen, for example, the PFPO operation-type-code is loaded into bits 33-39, and the PFPO operand format code for operand 1 is loaded into bits 40-47. In addition, in accordance with the preferred embodiment of the present invention, this register is provided, in bit 32, with a test bit, discussed in more detail below.

As mentioned above, not all available PFPO functions are installed on all computers. In accordance with this invention, a PFPO instruction is provided to determine whether a requested PFOP function is available. This PFPO instruction uses the above-mentioned test bit 32 of GR0. In addition, this PFPO instruction, in the preferred implementation, also uses a 2-bit code referred to as the condition code. FIG. 4 illustrates the PFPO instruction and the condition code.

Generally, a PFPO machine instruction is fetched and executed according to the present invention. When the PFOP machine instruction is executed, a requested operation specified by the function code in general register 0 is performed and the condition code is set to indicate the result. Also, preferably, when there are no exceptional conditions, condition code 0 is set. When an IEEE nontrap exception is recognized, condition code 1 is set. When an IEEE trap exception with alternate action is recognized, condition code 2 is set. A 32-bit return code is placed in bits 32-63 of another register, referred to as general register 1; bits 0-31 of general register 1 remain unchanged.

In an example z/Architecture compliant implementation of this invention, bit 32 of general register 0 is the test bit. When bit 32 is zero, the function specified by bits 33-63 of general register 0 is performed; each field in bits 33-63 must be valid and the combination must be a valid and installed function; otherwise a specification exception is recognized. When bit 32 is one, the function specified by bits 33-63 is not performed but, instead, the condition code is set to indicate whether these bits specify a valid and installed function; the condition code is set to 0 if the function is valid and installed, or to 3 if the function is invalid or not installed. This is particularly useful if additional functions are assigned in the future to the computer system. In the discussion below the test bit is zero except when stated otherwise.

Bits 33-39 of GR0 specify the operation type. For the PFPO-convert-floating-point-radix operation, other fields in general register 0 include first-operand format, second operand format, control flags, and rounding method.

For the PFPO-convert-floating point-radix operation, the second operand is converted to the format of the first operand and placed at the first-operand location, a return code is placed in bits 32-63 of general register 1, and the condition code is set to indicate whether an exceptional condition was recognized.

The first and second operands are in implicit floating-point registers (FPRs) of a set of FPRs defined for operands of floating point machine instructions. The first operand is in FPR0 (paired with FPR2 for extended). The second operand is in FPR4 (paired with FPR6 for extended).

As will be understood by those of ordinary skill in the art, the present invention may be used in conjunction with other registers, controls, functions or features of a computer system. For example, the PERFORM FLOATING-POINT OPERATION (PFPO) instruction is subject to the AFP-register control bit, bit 45 of a register referred to as control register 0. For PFPO to be executed successfully, the AFP-register-control bit must be one; otherwise, an AFP-register data exception, DXC 1, is recognized.

Figure 6:
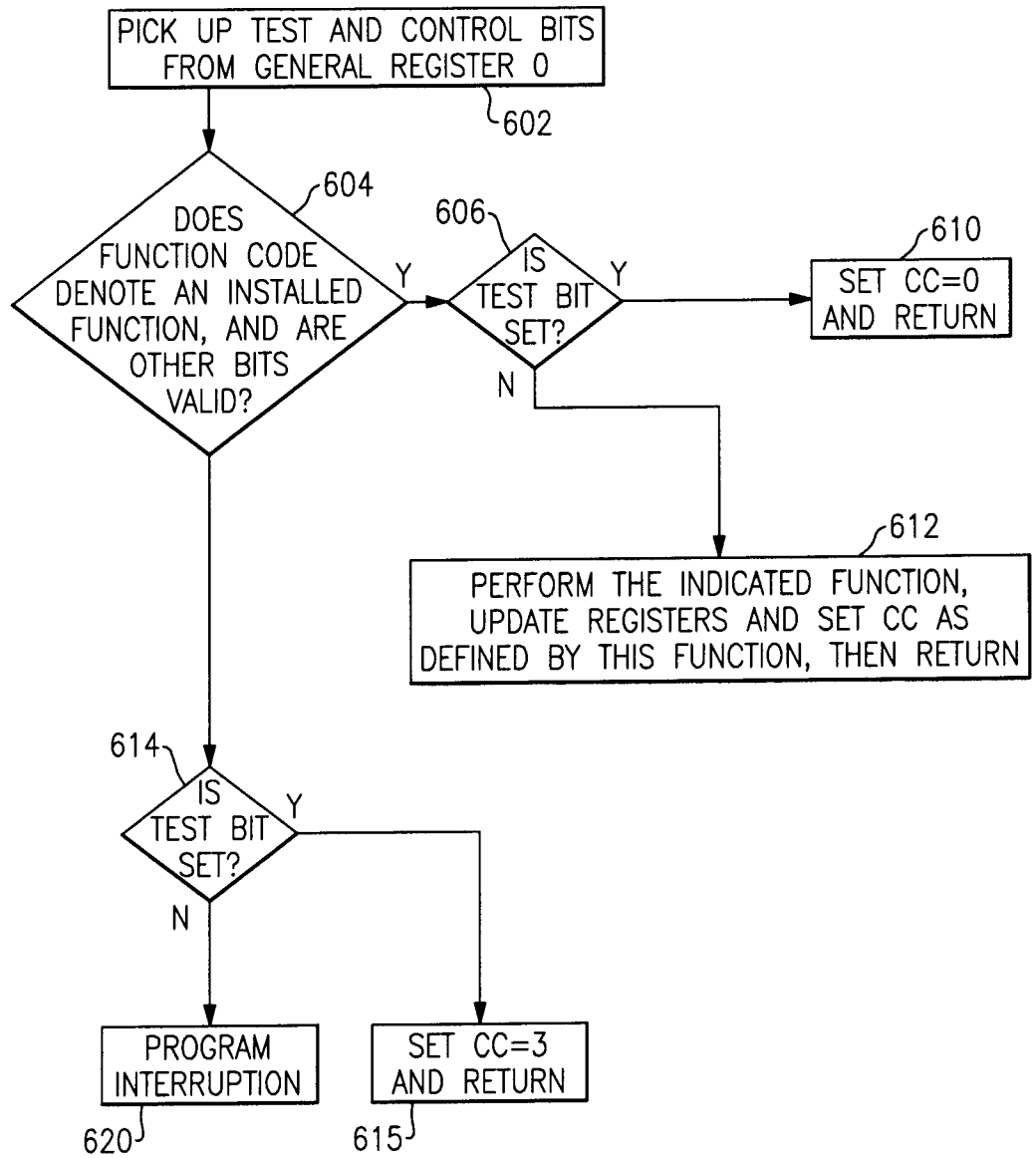
FIG. 6 illustrates how a test bit of the general register may be used in the practice of this invention.

FIG. 6 illustrates what the PFPO instruction does with respect to the test bit and the remaining function/control bits. At step 602, the routine shown in FIG. 6 obtains the test bit and the control bits from General Register 0. Then, at step 604, the routine determines whether the function code in the General Register 0 denotes an installed function and whether the other bits are valid for that function. If the function is installed and those other bits are valid, the routine proceeds to step 606, which determines if the test bit is set or not. If the test bit is set, the condition code is set to 0 at step 610, and the routine then returns to the next instruction in the program. If, however, at step 606, the test bit is not set, then, at step 612, the indicated function is performed, registers are updated, the condition code is set as defined by this function, and execution returns to the next instruction in the program.

At step 604, if either the requested function is not installed, or the other bits are not valid for that function, the routine proceeds to step 614, which also determines whether the test bit is set. Here, if the test bit is set, the routine proceeds to step 616, where the condition code is set to 3, and then the execution returns to the next instruction in the program. If, at step 616, the test bit is not set, then at step 620, a program interruption occurs. A program interruption means that control is transferred somewhere else, which, for example, may be to the operating system's program interrupt handler. This handler, unless explicitly told otherwise through various operating system services, would normally terminate the user's program and issue an error message to the user.

Figure 7:
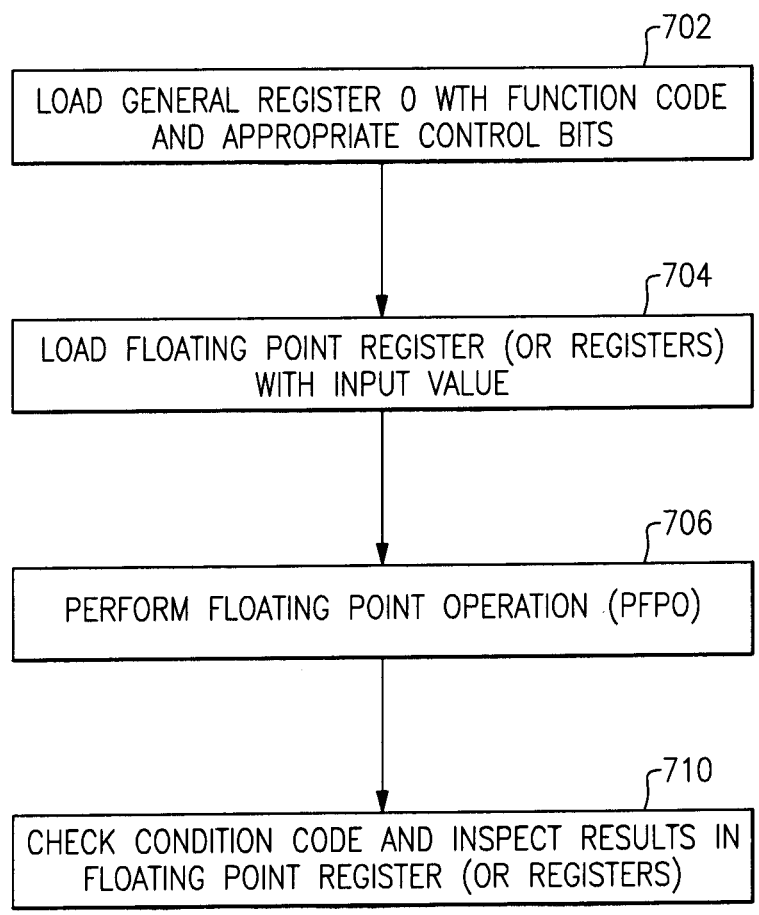
FIG. 7 shows how a program uses the PFPO instruction of the present invention for a function that the program expects to be supported in a computer.

FIG. 7 shows how a program uses the PFPO instruction for a function that the program expects to be supported. At step 702, the program loads General Register 0 with function code and appropriate test bits, and at step 704, the program loads one or more floating point registers with input values. At step 706, the floating point operation is performed, and then at step 710, the program checks the condition code and inspects the results in one or more floating point registers.

If the program was run on a machine that did not support the expected function, the PFPO instruction would not return in-line, and the program would usually be terminated with prejudice.

Figure 8:
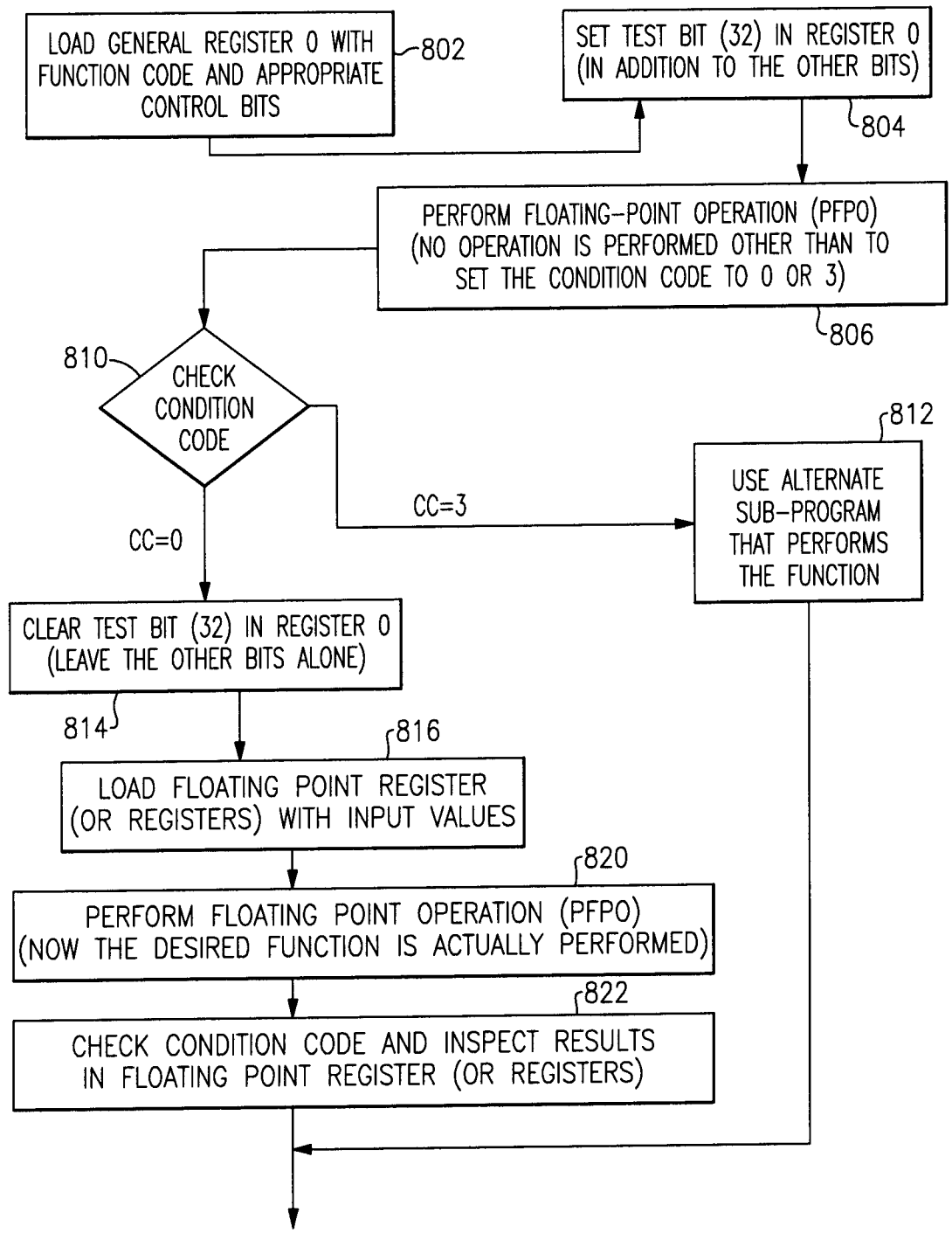
FIG. 8 illustrates how a program that wants to use a new PFPO function that may or may not be installed in the computer may be written.

FIG. 8 shows how a program that wants to use a new function that may or may not be installed on the computer would be written. If the function is installed, the program has less work to do, so the program wants to exploit if the function is available—but the program is prepared to perform this function in an alternate way that is much longer than using the PFPO instruction directly.

At step 802, the program loads General Register 0 with function code and appropriate control bits, and at step 804, the program sets test bit (32) in GR0. Other bits may also be set. Step 806 is to perform the floating-point operation; however, no operation is actually performed other than to set the condition code to either 0 or 3.

At step 810, the condition code is checked. If that code equals 3, then, at step 812, the function is performed via the alternate way provided for by the program itself. If however, at step 810, the condition code equals zero, the routine proceeds to steps 814, 816, 820 and 822. At step 814, test bit (32) in GR0 is cleared. Other bits may be left alone, though. At step 816, one or more floating registers are loaded with input values. Step 820 is to perform the floating-point operation, and here the desired function is actually performed. Then, at step 822, the program checks the condition code and inspects the results in said one or more floating point registers. The two paths in FIG. 8, from step 812 and 822 then rejoin.

The Perform Floating Point Operation instruction can be implemented in many architectures and may be emulated. As examples, the instruction is executed in hardware by a processor; by software executing on a processor having a native instruction set; or by emulation of a non-native instruction set that includes this instruction. In one particular example, the instruction is implemented in the z/Architecture®, offered by International Business Machines Corporation, Armonk, N.Y. z/Architecture® is a registered trademark of International Business Machines Corporation, Armonk, N.Y., U.S.A. Other names used herein may be registered trademarks, trademarks or product names of International Business Machines Corporation or other companies. One embodiment of the z/Architecture is described in "z/Architecture Principles of Operation," IBM Publication No. SA22-7832-05, 6$^{th}$ Edition, April 2007, which is hereby incorporated herein by reference in its entirety.

Various specific functions with which this invention may be used, and as implemented on the IBM z/Architecture, are discussed below.

Inexact-Suppression Control

Bit 56 of general register 0 is the inexact-suppression control. When the inexact-suppression control is zero, IEEE-inexact exceptions are recognized and reported in the normal manner. When the inexact-suppression control is one, IEEE-inexact exceptions are not recognized. The inexact-suppression control has no effect on the DXC; that is, the DXC for IEEE-overflow or IEEE-underflow exceptions along with the detail for exact, inexact and truncated, or inexact and incremented, is reported according to the actual condition.

Alternate-Exception-Action Control

Bit 57 of general register 0 is the alternate-exception-action control. The setting of this control affects the action taken for IEEE-overflow and IEEE-underflow trap exceptions.

When the alternate-exception-action control is zero, IEEE-overflow and IEEE-underflow trap exceptions are reported in the normal manner. That is, the appropriate data exception code (DXC) is placed in byte 2 of the floating-point control register, the operation is completed, and a program interruption for a data exception occurs. (As part of the program interruption, the DXC is stored at location 147.) This is called an IEEE trap exception with normal action.

When the alternate-exception-action control is one, the DXC is placed in byte 2 of the floating-point control register, the operation is completed, condition code 2 is set, and program execution continues with the next sequential instruction. (There is no program interruption and the DXC is not stored at location 147.) This is called an IEEE trap exception with alternate action.

HFP-Overflow Control:

Bit 58 of general register 0 is the HFP-overflow control. When the HFP-overflow control is zero, an HFP-overflow condition is reported as an IEEE-invalid-operation exception and is subject to IEEE-invalid-operation mask. When the HFP-overflow control is one, an HFP-overflow condition is reported as an IEEE-overflow exception and is subject to the IEEE-overflow mask.

The HFP-overflow control is defined only for HFP targets; when other than an HFP target is specified, this bit must be zero.

HFP-Underflow Control

For HFP targets, bit 59 of general register 0 is the HFP alternate underflow control. When the HFP-underflow control is zero, HFP-underflow causes the result to be set to a true zero with the same sign as the source and underflow is not reported. (The result in this case is inexact and subject to the inexact-suppression control.) When the HFP-underflow control is one, the condition is reported as an IEEE-underflow exception and is subject to the IEEE-underflow mask.

Bit 59 of general register 0 is defined only for HFP and DFP targets; when a BFP target is specified, this bit must be zero.

DFP Preferred Quantum Control (DPQC)

For DFP targets, bit 59 of general register 0 is the DFP preferred quantum control (DPQC). For radix conversion with DFP targets, if the delivered value is inexact, the cohort member with the smallest quantum is selected; if the delivered value is exact, selection depends on the value of bit 59 of general register 0, the DFP preferred quantum control (DPQC). When the delivered value is exact and the DPQC bit is zero, the cohort member with the largest quantum is selected. When the delivered value is exact and the DPQC bit is one, the preferred quantum is one and the cohort member with the quantum closest to one is selected.

Additional features of the IBM z-architecture and with which the present invention may be used are discussed below.

Return Code

Regardless of what condition code is set, and independent of whether the test bit is one, a 32-bit return code is placed in bits 32-63 of general register 1; bits 0-31 of general register 1 remain unchanged. A return code is also placed in general register 1 when a program interruption occurs for an IEEE trap exception that completes; general register 1 is not updated when a program interruption occurs for an IEEE trap exception that suppresses. Thus, general register 1 is updated on a program interruption for IEEE-overflow, IEEE-underflow, and IEEE-inexact trap exceptions, but is not updated on a program interruption for an IEEE-invalid-operation trap exception. Except where otherwise specified, the return code is a value of zero.

Sign Preservation

For PFPO convert floating-point radix, the sign of the result is the same as the sign of the source. The only exception to this is when the source is a NaN and the target is HFP; in this case, the result is the largest representable number in the target HFP format (H max) with the sign set to plus.

Preferred Quantum

For radix conversion with DFP targets, if the delivered value is inexact, the cohort member with the smallest quantum is selected; if the delivered value is exact, selection depends on the value of bit 59 of general register 0, the DFP preferred quantum control (DPQC). When the delivered value is exact and the DPQC bit is zero, the cohort member with the largest quantum is selected. When the delivered value is exact and the DPQC bit is one, the preferred quantum is one and the cohort member with the quantum closest to one is selected.

NaN Conversion

When converting between DFP and BFP, the sign of the NaN is always preserved, and the value of the payload is preserved, when possible. If the value of the source payload exceeds the maximum value of the target payload, the target is set to the default QNaN, but with the same sign as the source.

When traps are disabled, an SNaN is converted to the corresponding QNaN, and the payload is preserved, when possible; that is, SNaN(x) is converted to QNaN(x), where x is the value of the payload. For DFP, both QNaN(0) and SNaN(0) can be represented; but in BFP, there is a representation for QNaN(0), but not for SNaN(0).

Scaled Value and Signed Scaling Exponent (a) for PFPO

When, for the PFPO-convert-floating-point-radix operation, IEEE-overflow trap action or IEEE-underflow trap action occurs, the scaled value is computed using the following steps:

$$\Psi = b^\Omega$$

$$z = g + \Psi$$

Where $\Omega$ is the signed scaling exponent, b is the target radix (2, 10, or 16), $\Psi$ is the scale factor, g is the precision-rounded value, and z is the scaled value.

The signed scaling exponent (a) is selected to make the magnitude of the value of the scaled result (z) lie in the range:

$$1 [|z| < b$$

The value of the signed scaling exponent (a), treated as a 32-bit signed binary integer, is placed in bits 32-63 of general register 1; bits 0-31 of general register 1 remain unchanged.

The scaled value is used as the delivered value and is placed in the result location. For DFP targets, the cohort member with the quantum nearest to the scaled preferred quantum is selected. (But it should be noted that for all currently supported conversions, the result is always inexact, so the cohort member with the smallest quantum is selected.) For BFP targets, there are no redundant representations; there is only one member in a cohort. For HFP targets, the result is normalized.

HFP Values

Unnormalized HFP values are accepted on input, but all HFP results are normalized. If an HFP result would be less than the smallest (in magnitude) representable normalized number, an HFP-underflow condition exists.

HFP-Overflow and Underflow for PFPO

For an HFP target of a PFPO-convert-floating-point-radix operation, the handling of overflow and underflow conditions is controlled by the HFP-overflow control and the HFP-underflow control, respectively.

HFP-Overflow

An HFP-overflow condition exists when an HFP target precision's largest number (H max) is exceeded in magnitude by the precision-rounded value. That is, when the characteristic of a normalized HFP result would exceed 127 and the fraction is not zero.

When the HFP-overflow control is zero, HFP-overflow is reported as an IEEE-invalid-operation exception and is subject to the IEEE-invalid-operation mask in the FPC register. This is called an HFP-overflow-as-IEEE-invalid-operation condition.

When the HFP-overflow control is one, HFP-overflow is reported as an IEEE-overflow exception and is subject to the IEEE-overflow mask in the FPC register. This is called an HFP-overflow-as-IEEE-overflow condition.

HFP-Underflow

An HFP-underflow condition exists when the precision-rounded value is nonzero and less in magnitude than the HFP target precision's smallest normalized number, H min. That is, when the characteristic of a normalized HFP result would be less than zero and the fraction is not zero. The result is set to a true zero with the same sign as the source. Reporting of the HFP-underflow condition is subject to the HFP-underflow control. The result in this case, however, is inexact and is subject to the controls for that condition.

When the HFP-underflow control is zero, the HFP-underflow condition is not reported.

When the HFP-underflow control is one, HFP-underflow is reported as an IEEE-underflow exception and is subject to the IEEE-underflow mask in the FPC register. This is called an HFP-underflow-as-IEEE-underflow condition.

IEEE Exceptions for PFPO

Except where otherwise stated, the following discussion on IEEE exceptions applies to both BFP and DFP.

IEEE-Invalid-Operation

An IEEE-invalid-operation exception is recognized when any of the following occurs:
1. An SNaN is encountered in an IEEE source.
2. In an IEEE-to-HFP conversion, a NaN or an infinity is encountered in the IEEE source.
3. An HFP-overflow-as-IEEE-invalid-operation condition exists.

IEEE-invalid-operation exceptions are recognized as either IEEE-invalid-operation nontrap exceptions or IEEE-invalid-operation trap exceptions.

IEEE-Invalid-Operation Nontrap Action

IEEE-invalid-operation nontrap action occurs when an IEEE-invalid-operation exception is recognized and the IEEE-invalid-operation mask bit in the FPC register is zero. The operation is completed, the IEEE-invalid-operation flag bit in the FPC register is set to one, and condition code 1 is set. The result is as follows:

When the target is IEEE and the source is an IEEE SNaN, the result is the source NaN converted to the corresponding canonical QNaN in the target format.

When the target is HFP and the source is an IEEE NaN, the result is the largest representable number in the target HFP format (H max) with the sign set to plus.

When the target is HFP and the source is an IEEE infinity, the result is H max with the same sign as the source.

When an HFP-overflow-as-IEEE-invalid-operation condition exists, the result is H max with the same sign as the source.

IEEE-Invalid-Operation Trap Action

IEEE-invalid-operation trap action occurs when an IEEE-invalid-operation exception is recognized and the IEEE-invalid-operation mask bit in the FPC register is one. The operation is suppressed, and the exception is reported as a program interruption for a data exception with DXC 80 hex.

IEEE-Overflow

For IEEE targets, an IEEE-overflow exception is recognized when the precision-rounded value is greater in magnitude than the largest finite number (N max) representable in the target format. For HFP targets, an IEEE-overflow exception is recognized when the HFP-overflow condition exists and the HFP-overflow control is one.

IEEE-Overflow Nontrap Action

IEEE-overflow nontrap action occurs when the IEEE-overflow exception is recognized and the IEEE-overflow mask bit in the FPC register is zero.

The operation is completed and the IEEE-overflow flag bit in the FPC register is set to one. For IEEE targets, the result of the operation depends on the sign of the precise intermediate value and on the effective rounding method:
1. For all round-to-nearest methods and round away-from-0, the result is infinity with the sign of the precise intermediate value.
2. For round-toward-0 and round-to-prepare-for shorter-precision, the result is the largest finite number of the format, with the sign of the precise intermediate value.
3. For round toward +∞, the result is +∞ if the sign is plus, or it is the negative finite number with the largest magnitude if the sign is minus.
4. For round toward −∞, the result is the largest positive finite number if the sign is plus or −∞ if the sign is minus.

For HFP targets, the result is set to the largest representable number in the target HFP format (H max) with the same sign as the source.

Additional action depends on whether there is also an IEEE-inexact exception.

When IEEE-overflow nontrap action occurs and no IEEE-inexact exception has been recognized, the IEEE-overflow flag bit in the FPC register is set to one and condition code 1 is set. (This case can occur only when the inexact-suppression control is one.)

When both IEEE-overflow nontrap action and IEEE-inexact nontrap action occur, the IEEE-overflow and IEEE-inexact flag bits in the FPC register are set to ones and condition code 1 is set. When IEEE-overflow nontrap action and IEEE-inexact trap action occur, the condition code is not set, the IEEE-overflow flag bit in the FPC register is set to one, and the IEEE-inexact exception is reported as a program interruption for a data exception with DXC 08 or 0C hex, depending on whether the result is inexact and truncated or inexact and incremented, respectively.

IEEE-Overflow Trap Action

IEEE-overflow trap action occurs when the IEEE-overflow exception is recognized and the IEEE-overflow mask bit in the FPC register is one.

The operation is completed by setting the result to the scaled value; placing the value of the signed scaling exponent ($\Omega$), treated as a 32-bit signed binary integer in bits 32-63 of general register 1; and setting DXC 20, 28, or 2C hex, depending on whether the delivered value is exact, inexact and truncated, or inexact and incremented, respectively.

For DFP targets, the delivered value is always inexact and the cohort member with the smallest quantum is selected.

Additional action depends on the value of the alternate-exception-action control.

When the alternate-exception-action control is zero, the condition code is not set and the exception is reported as a program interruption for a data exception.

When the alternate-exception-action control is one, condition code 2 is set and no program interruption occurs.

IEEE-Underflow

For IEEE targets, an IEEE-underflow exception is recognized when the tininess condition exists and either: (1) the IEEE-underflow mask bit in the FPC register is zero and the denormalized value is inexact, or (2) the IEEE-underflow mask bit in the FPC register is one.

The tininess condition exists when the precise intermediate value of an IEEE computational operation is nonzero and smaller in magnitude than the smallest normal number (N min) representable in the target format.

The denormalized value is inexact if it is not equal to the precise intermediate value.

For HFP targets, an IEEE-underflow exception is recognized when the HFP-underflow condition exists and the HFP-underflow control is one.

IEEE-Underflow Nontrap Action

IEEE-underflow nontrap action occurs when the IEEE-underflow exception is recognized and the IEEE-underflow mask bit in the FPC register is zero.

The operation is completed and the IEEE-underflow flag bit in the FPC register is set to one.

For IEEE targets, the result is set to the denormalized value. For DFP targets, the cohort member with the smallest quantum is selected.

For HFP targets, the result is set to a true zero with the same sign as the source.

Additional action depends on whether there is also an IEEE-inexact exception. When IEEE-underflow nontrap action occurs and no IEEE-inexact exception has been recognized, the IEEE-underflow flag bit in the FPC register is set to one and condition code 1 is set. (This case can occur only when the inexact-suppression control is one.)

When both IEEE-underflow nontrap action and IEEE-inexact nontrap action occur, the IEEE-underflow and IEEE-inexact flag bits in the FPC register are set to ones and condition code 1 is set.

When IEEE-underflow nontrap action and IEEE-inexact trap action occur, the condition code is not set, the IEEE-underflow flag bit in the FPC register is set to one, and the IEEE-inexact trap exception is reported as a program interruption for a data exception with DXC 08 or 0C hex, depending on whether the result is inexact and truncated or inexact and incremented, respectively.

IEEE-Underflow Trap Action

IEEE-underflow trap action occurs when the IEEE-underflow exception is recognized and the IEEE-underflow mask bit in the FPC register is one.

The operation is completed by setting the result to the scaled value; placing the value of the signed scaling exponent (a), treated as a 32-bit signed binary integer in bits 32-63 of general register 1; and setting DXC 10, 18, or 1C hex, depending on whether the result is exact, inexact and truncated, or inexact and incremented, respectively.

For DFP targets, the delivered value is always inexact and the cohort member with the smallest quantum is selected.

Additional action depends on the value of the alternate-exception-action control.

When the alternate-exception-action control is zero, the condition code is not set and the exception is reported as a program interruption for a data exception.

When the alternate-exception-action control is one, condition code 2 is set and no program interruption occurs.

IEEE-Inexact

An IEEE-inexact exception is recognized when, for a PFPO-convert-floating-point-radix operation, an inexact condition exists, recognition of the exception is not suppressed, and neither IEEE-overflow trap action nor IEEE-underflow trap action occurs.

An inexact condition exists when the rounded intermediate value differs from the precise intermediate value. The condition also exists when IEEE-overflow nontrap action occurs.

Even though an inexact condition exists, the IEEE-inexact exception is not recognized if the inexact suppression control is one or if IEEE-overflow or IEEE-underflow trap action occurs. When an inexact condition exists and the conditions for an IEEE-overflow trap action or IEEE-underflow trap action also apply, the trap action takes precedence and the inexact condition is reported in the DXC.

IEEE-Inexact Nontrap Action

IEEE-inexact nontrap action occurs when the IEEE-inexact exception is recognized and the IEEE-inexact mask bit in the FPC register is zero.

In the absence of another IEEE nontrap action, the operation is completed using the rounded intermediate value, condition code 1 is set, and the IEEE-inexact flag bit in the FPC register is set to one. For DFP targets, the cohort member with the smallest quantum is selected.

When an IEEE-inexact nontrap action and another IEEE nontrap action coincide, the operation is completed using the result specified for the other exception and the flag bits for both exceptions are set to one, and condition code 1 is set.

IEEE-Inexact Trap Action

IEEE-inexact trap action occurs when the IEEE-inexact exception is recognized and the IEEE-inexact mask bit in the FPC register is one. The operation is completed, the condition code is not set, and the exception is reported as a program interruption for a data exception with DXC 08 or 0C hex, depending on whether the result is inexact and truncated or inexact and incremented, respectively. In the absence of a coincident IEEE nontrap action, the delivered value is set to the rounded intermediate value. For DFP targets, the cohort member with the smallest quantum is selected. When the IEEE-inexact trap action coincides with an IEEE nontrap action, the operation is completed using the result specified for the IEEE nontrap action, the flag bit for the nontrap exception is set to one, and the IEEE-inexact trap action takes place.

Resulting Condition Code (when test bit is zero):
0 Normal result
1 Nontrap exception
2 Trap exception with alternate action
3- -

Resulting Condition Code (when test bit is one):
0 Function is valid
1- -
2- -
3 Function is invalid IEEE Exceptions:
Invalid operation,
Overflow,
Underflow,
Inexact.

Program Exceptions:
Data with DXC 1, AFP register,
Data with DXC for IEEE exception,
Operation (if the PFPO facility is not installed),
Specification.

The following points may also be taken into consideration when writing a program using the PFPO function.

The PFPO-convert-floating-point-radix operation performs "correct rounding"; that is, the result is accurately obtained from the precise intermediate value using the effective rounding method. This is in contrast to some radix conversion programs, which may produce results with larger rounding errors. A value of zero in the rounding method field (GR0 bits 60-63) specifies rounding according to the current DFP rounding mode (FPC 3.1-3) regardless of whether the target is DFP, BFP, or HFP.

If the program does not supply a default QNaN (payload=zero) as a source, then its presence as a result indicates that the machine either created a new QNaN or the program attempted to convert a payload, which was too large for this format.

If the program restricts payloads to values within the smallest payload capacity of any format to be converted to, then payloads are preserved across radix conversions.

In the absence of suppression, bits 32-63 of general register 1 are always set to a return code, even though, in most cases, the return code is zero. Future extensions of PFPO may make more use of nonzero return codes. With the current definition, the only nonzero return codes are set for IEEE-overflow trap exceptions and IEEE-underflow trap exceptions. In this case, the value of the signed scaling exponent (a), is placed in bits 32-63 of general register 1. For IEEE-inexact trap exceptions, the return code is set to zero, thus indicating that no scaling has occurred.

To display a value in scientific notation, many programming languages, calculators, and spreadsheets use the letter e (or E) to separate the significand from the exponent. This is referred to as e-form notation. In this document, e-form notation, along with other forms of conventional numeric notation, is used to represent a value without regard to quantum. To indicate that both value and quantum are being represented, a variation of e-form notation, called q-form notation, is used. In q-form notation, the letter q replaces the letter e and the value shown after q is the right-units-view exponent, that is, the base 10 logarithm of the quantum. Thus, for example, the seven members of the cohort for the value 1e6 in the DFP short format are: 1q6, 10q5, 100q4, 1000q3, 10000q2, 100000q1, and 1000000q0.

As an example of the distinction between e-form and q-form notation, consider the representation of the members of the cohort of zero. The DFP short format, for example, can represent 198 exact powers of 10, ranging in value from 1e-101 to 1e96; but can represent only 192 values for a quantum, ranging from 1e-101 to 1e90. Thus, the 192 members of the cohort for zero range from 0q-101 to 0q90.

Figure 9:
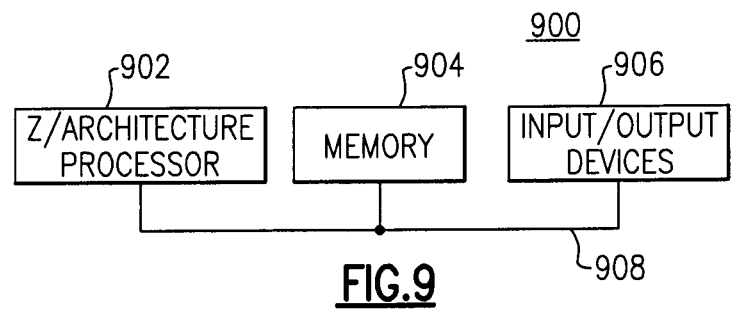
FIG. 9 depicts one embodiment of a processing environment to incorporate and use one or more aspects of the present invention.

In one embodiment, a processor of a processing environment executes the Floating Point Operation instruction. One embodiment of a processing environment to incorporate and use one or more aspects of the present invention is described with reference to FIG. 9. Processing environment 900 includes, for instance, a z/Architecture® processor 902 (e.g., a central processing unit (CPU)), a memory 904 (e.g., main memory), and one or more input/output (I/O) devices 906 coupled to one another via, for example, one or more buses 908 and/or other connections.

In the example shown, z/Architecture® processor 902 is a part of a System z™ server, offered by International Business Machines Corporation (IBM®), Armonk, N.Y. System z™ servers implement IBM's z/Architecture®, which specifies the logical structure and functional operation of the computer. The System z™ server executes an operating system, such as z/OS®, also offered by International Business Machines Corporation. IBM® and z/OS® are registered trademarks of International Business Machines Corporation, Armonk, N.Y., USA. Other names used herein may be registered trademarks, trademarks or product names of International Business Machines Corporation or other companies.

In another embodiment, the instruction and/or the logic of the instruction can be executed in a processing environment that is based on one architecture (which may be referred to as a "native" architecture), but emulates another architecture (which may be referred to as a "guest" architecture). In such an environment, for example, the Perform Floating Point Operation instruction and/or logic thereof, which is specified in the z/Architecture® and designed to execute on a z/Architecture® machine, is emulated to execute on an architecture other than the z/Architecture®. One example of this processing environment is described with reference to FIGS. 10-11.

Figure 10:
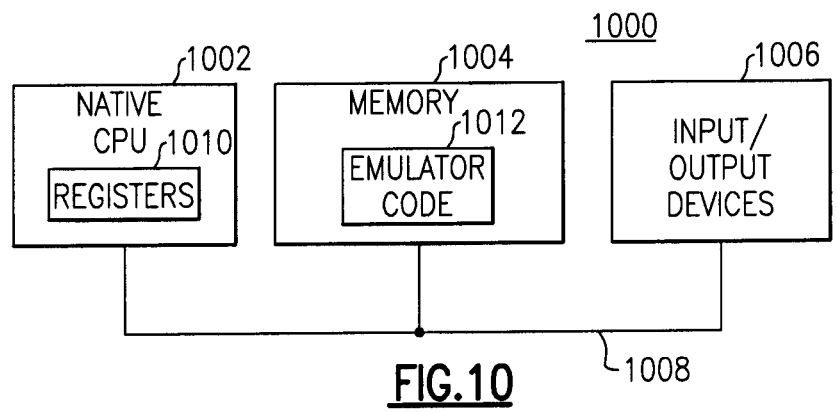
FIG. 10 depicts another embodiment of a processing environment to incorporate and use one or more aspects of the present invention.

Referring to FIG. 10, one embodiment of a processing environment to incorporate and use one or more aspects of the present invention is described. Processing environment 1000 includes, for instance, a native central processing unit 1002, a memory 1004 (e.g., main memory) and one or more input/output (I/O) devices 1006 coupled to one another via, for example, one or more buses 1008 and/or other connections. As examples, processing environment 1000 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 1002 includes one or more native registers 1010, such as one or more general-purpose registers and/or one or more special purpose registers, used during processing within the environment. These registers include information that represents the state of the environment at any particular point in time.

Moreover, native central processing unit 1002 executes instructions and code that are stored in memory 1004. In one particular example, the central processing unit executes emulator code 1012 stored in memory 1004. This code enables the processing environment configured in one architecture to emulate another architecture. For instance, emulator code 1012 allows machines based on architectures other than the z/Architecture®, such as Power PC® processors, pSeries® servers, xSeries® servers, HP Superdome® servers, or others to emulate the z/Architecture® and to execute software and instructions developed based on the z/Architecture®.

Figure 11:
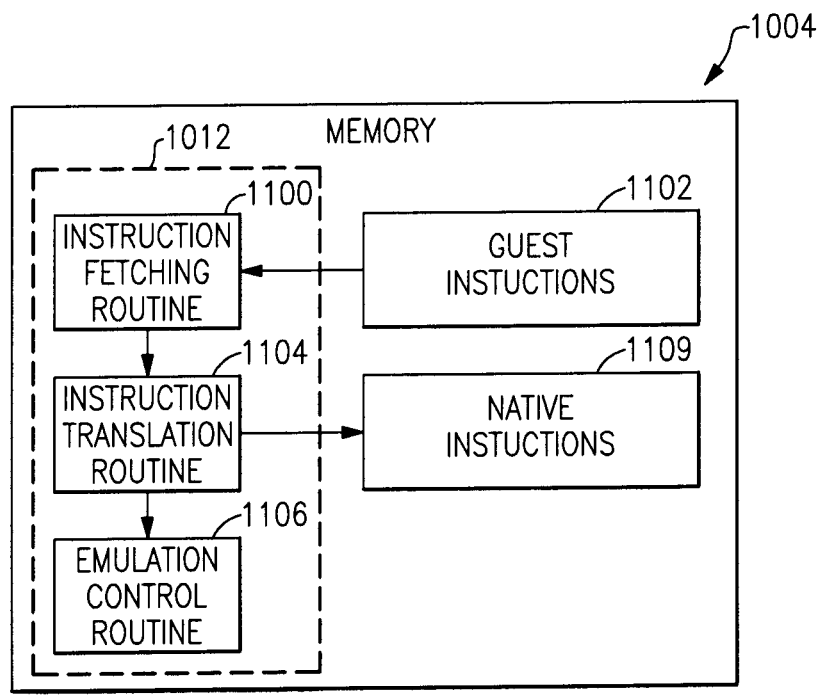
FIG. 11 depicts further details of the memory of FIG. 10, in accordance with an aspect of the present invention.

Further details relating to emulator code 1012 are described with reference to FIG. 11. Guest instructions 1102 comprise software instructions (e.g., machine instructions) that were developed to be executed in an architecture other than that of native CPU 1002. For example, guest instructions 1102 may have been designed to execute on z/Architecture® processor 902, but are instead being emulated on native CPU 1002 (which may be for example an Intel® Itanium® 2 processor). In one example, emulator code 1012 includes an instruction fetching routine 1100 to obtain one or more guest instructions 1102 from memory 1004, and to optionally provide local buffering for the instruction obtained. It also includes an instruction translation routine 1104 to determine the type of guest instruction that has been obtained and to translate the guest instruction into one or more corresponding native instructions 1109. This translation includes, for instance, identifying the function to be performed by the guest instruction and choosing the native instructions to perform that function.

Further, emulator 1012 includes an emulation control routine 1106 to cause the native instructions to be executed. Emulation control routine 1106 may cause native CPU 1002 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 1109 may include loading data into a register from memory 1004; storing data back to memory from a register; or performing some type of arithmetic or logical operation, as determined by the translation routine.

Each routine is, for instance, implemented in software, which is stored in memory and executed by the native central processing unit 1002. In other examples, one or more of the routines or operations are implemented in firmware, hardware, software or some combination thereof. The registers of the emulated guest processor may be emulated using the registers 1010 of the native CPU or by using locations in memory 1004. In embodiments, the guest instructions 1102, native instructions 1109, and emulation code 1012 may reside in the same memory or may be dispersed among different memory devices.

In one example, a guest instruction 1102 that is obtained, translated and executed is the Perform Floating Point Operation instruction or similar instruction. The Perform Floating Point Operation instruction, which is a z/Architecture® instruction in this example, is fetched from memory, translated and represented as a sequence of native instructions 1109 (e.g., Power PC®, pSeries®, xSeries®, Intel®, etc.) which are executed.

In another embodiment, a Perform Floating Point Operation instruction is executed in another architecture environment including, for example, an architecture as described in the "INTEL® 64 and IA-32 Architectures Software Developer's Manual Volume 1," Order Number 253665-022US, November 2006; "INTEL® 64 and IA-32 Architectures Software Developer's Manual Volume 2A," Order Number 253666-022US, November 2006; the "INTEL® Itanium® Architecture Software Developer's Manual Volume 1," Doc. No. 245317-005, January 2006; the "INTEL® Itanium® Architecture Software Developer's Manual Volume 2," Doc. No. 245318-005, January 2006; and/or the "INTEL® Itanium® Architecture Software Developer's Manual Volume 3," Doc. No. 245319-005, January 2006; each of which is hereby incorporated herein by reference in its entirety.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable medium. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 12:
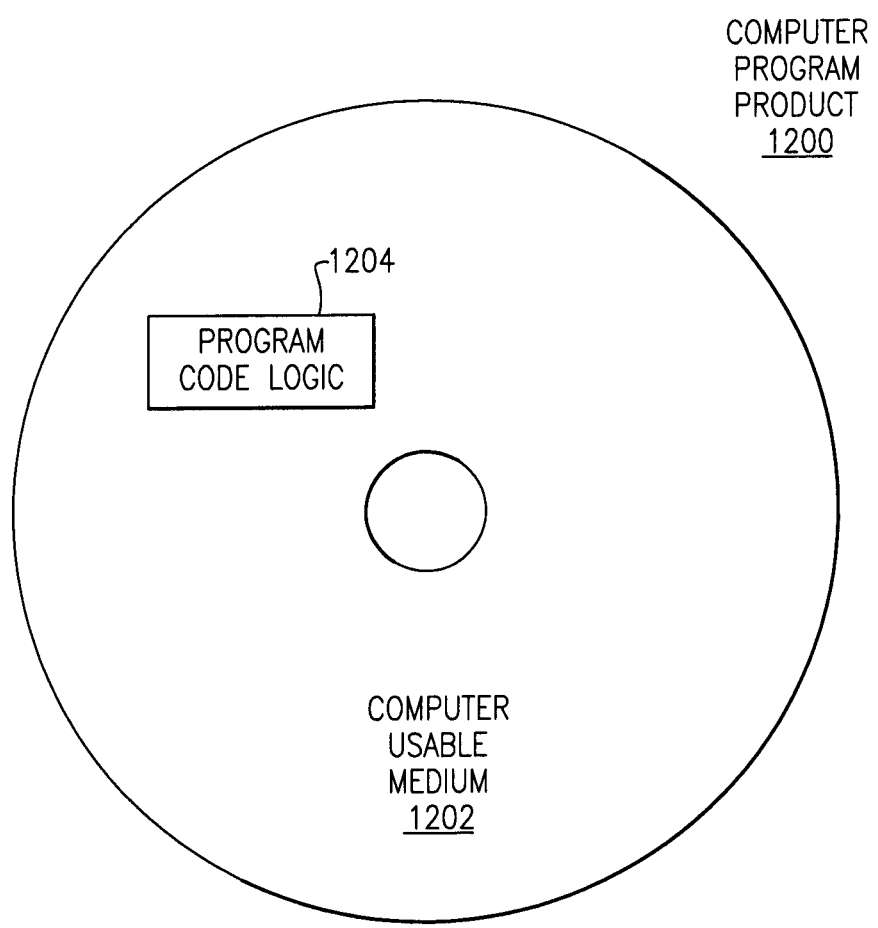
FIG. 12 depicts one example of a computer program product to incorporate one or more aspects of the present invention.

One example of an article of manufacture or a computer program product incorporating one or more aspects of the present invention is described with reference to FIG. 12. A computer program product 1200 includes, for instance, one or more computer usable media 1202 to store computer readable program code means or logic 1204 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid-state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for facilitating detection of whether, for instructions, which support more subfunctions, and which may support more subfunctions in the future, a particular subfunction is installed, without risking program termination due to use of an uninstalled feature.

Although one or more examples have been provided herein, these are only examples. Many variations are possible without departing from the spirit of the present invention. For instance, processing environments other than the examples provided herein may include and/or benefit from one or more aspects of the present invention. As an example, a processor can be other than an IBM System z™ processor and can execute an operating system other than z/OS®. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

Additionally, the instruction can include other registers or entities other than registers to designate information. Further, although examples of registers are described above, each of the registers may include more, less or different information. Further, each may include additional data not necessarily needed in one or more aspects of the present invention. Specific location within the registers for the information is implementation and/or architecture dependent. Yet further, different data and/or positioning within the registers and/or entities are possible.

Still further, one or more aspects of the present invention can be usable with other floating point systems, including variations on the decimal floating point described herein. One or more aspects of the present invention can be used with any floating point systems that include quantum, including hexadecimal or others. Further, the formats of decimal floating-point numbers, as well as properties and any other characteristics, including but not limited to, the contents of the data formats may be different than described herein. A decimal floating point number can be defined as having more, less or different components than described herein; definitions can vary; and/or there can be more, less or different formats.

Moreover, although in the logic of Perform Floating Point Operation instruction, the test bit is set equal to one of a set of particulars numbers, other numbers or entities may be used. Further, steps of the instruction can be performed in differing order.

Additional details regarding decimal floating point are described in "Round for Reround Mode In Decimal Floating Point Instruction," U.S. Ser. No. 11/680,894, filed Mar. 1, 2007, which is hereby incorporated herein by reference in its entirety.

As used herein, the term "obtaining" as in, for instance, "obtaining an instruction" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the claims.

What is claimed is:

1. A computer-implemented method of performing an instruction for converting a floating-point operand, the method comprising:
   executing, by a processor, the instruction, the executing comprising:
      based on a test indicator being one value:
         performing a specified floating-point conversion function to produce a result, wherein the specified floating-point conversion function is one of a plurality of specifiable floating-point conversion functions;
         storing the result; and
         setting a condition code, the condition code indicating whether the performing the specified floating-point conversion function encountered an exceptional condition; and
      based on the test indicator being another value:
         determining whether the specified floating-point conversion function is an installed floating-point conversion function which the processor is configured to execute;
         setting the condition code without storing a result, the condition code set based on the test indicator being another value indicating whether the specified floating-point conversion function is an installed floating-point conversion function; and
         setting a return code.

2. The computer-implemented method of claim 1, wherein a first value of the condition code indicates that the specified floating-point conversion function is installed and a second value of the condition code indicates that the specified floating-point conversion function is invalid or not installed.

3. The computer-implemented method of claim 1, wherein the test indicator is located in a selected register.

4. The computer-implemented method of claim 3, wherein the selected register is a general register.

5. The computer-implemented method of claim 4, wherein the general register is an implied operand of the instruction.

6. The computer-implemented method of claim 1, wherein the specified floating-point conversion function is specified in a chosen register accessed by the instruction.

7. The computer-implemented method of claim 6, wherein the chosen register is a general register, the general register further including the test indicator.

8. The computer-implemented method of claim 1, wherein the return code is included in a particular register.

9. The computer-implemented method of claim 8, wherein the particular register is a particular general register.

10. The computer-implemented method of claim 9, wherein the particular general register is different from a selected general register including the test indicator.

11. A computer system for performing an instruction for converting a floating-point operand, the computer system comprising:
   a memory; and a processor in communication with the memory, wherein the computer system is configured to perform a method, said method comprising:

executing, by the processor, the instruction, the executing comprising:

based on a test indicator being one value:

performing a specified floating-point conversion function to produce a result, wherein the specified floating-point conversion function is one of a plurality of specifiable floating-point conversion functions;

storing the result; and setting a condition code, the condition code indicating whether the performing the specified floating-point conversion function encountered an exceptional condition; and based on the test indicator being another value:

determining whether the specified floating-point conversion function is an installed floating-point conversion function which the processor is configured to execute;

setting the condition code without storing a result, the condition code set based on the test indicator being another value indicating whether the specified floating-point conversion function is an installed floating-point conversion function; and setting a return code.

12. The computer system of claim 11, wherein a first value of the condition code indicates that the specified floating-point conversion function is installed and a second value of the condition code indicates that the specified floating-point conversion function is invalid or not installed.

13. The computer system of claim 11, wherein the test indicator is located in a selected register.

14. The computer system of claim 11, wherein the specified floating-point conversion function is specified in a chosen register accessed by the instruction.

15. The computer system of claim 14, wherein the chosen register is a general register, the general register further including the test indicator.

16. A computer program product for performing an instruction for converting a floating-point operand, the computer program product comprising:

a non-transitory computer readable storage medium readable by a processing circuit and storing instructions for performing a method comprising:

executing, by a processor, the instruction, the executing comprising:

based on a test indicator being one value:

performing a specified floating-point conversion function to produce a result, wherein the specified floating-point conversion function is one of a plurality of specifiable floating-point conversion functions;

storing the result; and setting a condition code, the condition code indicating whether the performing the specified floating-point conversion function encountered an exceptional condition; and based on the test indicator being another value:

determining whether the specified floating-point conversion function is an installed floating-point conversion function which the processor is configured to execute;

setting the condition code without storing a result, the condition code set based on the test indicator being another value indicating whether the specified floating-point conversion function is an installed floating-point conversion function; and setting a return code.

17. The computer program product of claim 16, wherein a first value of the condition code indicates that the specified floating-point conversion function is installed and a second value of the condition code indicates that the specified floating-point conversion function is invalid or not installed.

18. The computer program product of claim 16, wherein the test indicator is located in a selected register.

19. The computer program product of claim 16, wherein the specified floating-point conversion function is specified in a chosen register accessed by the instruction.

20. The computer program product of claim 19, wherein the chosen register is a general register, the general register further including the test indicator.

\* \* \* \* \*